United States Patent [19]

Marmo

[11] 4,193,502
[45] Mar. 18, 1980

[54] PELLET DIMENSION CHECKER
[75] Inventor: Anthony R. Marmo, Cheswick, Pa.
[73] Assignee: Westinghouse Electric Corp., Pittsburgh, Pa.
[21] Appl. No.: 792,290
[22] Filed: Apr. 29, 1977
[51] Int. Cl.² ........................ B07C 5/09; B07C 5/16
[52] U.S. Cl. .................................. 209/555; 209/593; 209/602
[58] Field of Search ................. 209/73, 74, 75, 88, 209/121

[56] References Cited
U.S. PATENT DOCUMENTS 3,272,332  9/1966  Jones ............................ 209/75

3,282,116  11/1966  Jones ............................ 209/75 X

*Primary Examiner*—Allen N. Knowles
*Attorney, Agent, or Firm*—L. A. DePaul; Z. L. Dermer

[57] ABSTRACT

A pellet dimension checker for determining the weight, length, and density of a pellet such as a nuclear fuel pellet. The checker comprises a rotatable arm for transferring a pellet from a pellet conveyor, to several dimensional measuring stations, and back to the conveyor if the dimensions of the pellet are determined to be within predetermined limits. Should the pellet be nonconforming, the rotatable arm removes the pellet from the process stream.

11 Claims, 4 Drawing Figures

PELLET DIMENSION CHECKER

BACKGROUND OF THE INVENTION

This invention relates to dimensional checking apparatus and particularly to apparatus for measuring the dimensions of nuclear fuel pellets.

In many designs of nuclear reactors, the reactor vessel has an inlet and outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, ceramic fuel pellets of a uranium compound, is stacked within the matallic sheath. During reactor operation, the nuclear fuel pellets fission releasing fission products such as fission gas while generating heat in a manner well known in the art.

There are many known methods for manufacturing the nuclear fuel pellets used in nuclear reactors. Most of these methods generally consist of cold pressing a powder which may be an oxide of fissionable material such as uranium dioxide to form dense compacts. These dense compacts are generally referred to as green pellets. The green pellets are then sintered in a non-oxidizing atmosphere to produce a sintered pellet which may have slight irregularities on its surface. The sintered pellet may then be ground to remove those irregularities thereby forming a right cylindrical pellet. This finished pellet is then stacked within the metallic sheath to form the fuel element that may be used in a nuclear reactor.

A commonly known method for producing the nuclear fuel pellets is described in U.S. Pat No. 2,991,601 to J. Glatter et al, issued July 11, 1961. In this process, hydrogen reduction of uranium trioxide is employed to produce uranium dioxide powder. As received from commercial manufacturers, this uranium dioxide is not free flowing and is, therefore, not adaptable for use in automatic machinery for the production of the green pellets. In order to produce a free flowing powder, the uranium dioxide powder is mixed with a suitable binder such as aluminum stearate and water to form a wet granulate. The wet granulate is then forced through a screen and dried, after which it is dry-screened thereby separating the larger particles from the smaller particles. The water may be substantially removed in the later sintering process while the aluminum stearate will remain and act as a lubricant in the compacting process. Once the uranium dioxide powder has thus been converted into a free flowing granulate, the granulate is then compacted into green pellets in a cold pressing operation. The compacting process comprises flowing the granulate into a die and cold pressing the granulate in the die into substantially cylindrical green pellets. The green pellets may then be heat treated, sintered and ground to form the finished pellet for use in nuclear fuel elements.

With the demand for nuclear fuel increasing it has become a commercial necessity to be able to mass produce the green pellets. The known procedures for mass producing green pellets have generally involved open area access to the apparatus and green pellets. This type of procedure is acceptable when the nuclear fuel used in the pellet is a non-irradiated uranium compound because such nuclear fuel does not pose serious radiological problems for working personnel. However, when the nuclear fuel employed is plutonium or a reprocessed uranium compound, increased safeguards are necessary to insure that working personnel do not become overexposed.

One step in the manufacture of the nuclear fuel pellet is the inspection of the green pellet to ascertain if the pellet dimensions are within acceptable limits. Of particular importance is the green pellet density. The conventional method of checking green pellet density is for the pellet press operator to remove a pellet by hand from the pellet stream leaving the pellet press, measure the pellet length by hand micrometer, determine the weight of the pellet by placing it on a gram balance, and then using a chart with length-weight coordinates determine the green pellet density. While this manual operation is acceptable with a less toxic fuel, a more toxic fuel requires that this procedure be performed in a glove box environment to thereby protect the operator from radiation exposure. However, a glove box type procedure is not adequate when it is desired to mass produce the green pellets. It is, therefore, desirable to eliminate operator handling from the green pellet dimensional check by mechanizing the sequence of operations thus permitting the operator to monitor the operation remotely.

SUMMARY OF THE INVENTION

A pellet dimension checker for determining the physical characteristics of a pellet such as a nuclear fuel pellet. The checker comprises a rotatable arm for transferring a pellet from a pellet conveyor, to several dimensional measuring stations and back to the conveyor if the dimensions of the pellet are determined to be within predetermined limits. Should the pellet be nonconforming, the rotatable arm removes the pellet from the process stream. The dimensional measuring stations may comprise weight, length, and density measuring apparatus.

BRIEF DESCRIPTION OF THE DRAWINGS

While the specification concludes with claims specifically pointing out and distinctly claiming the subject matter of the invention, it is believed the invention will be better understood from the following description taken in conjuction with the accompanying drawings, wherein:

DESCRIPTION OF THE PREFERRED EMBODIMENT

In the manufacture of nuclear fuel pellets it is necessary to monitor the dimensions of the pellets to assure that the dimensions are within predetermined limits. The mass production of nuclear fuel pellets utilizing plutonium or other such fuel requires that this monitoring be performed by machine to thereby avoid operator exposure to the nuclear fuel. The invention described herein is a pellet dimension checker for use in such a process.

Figure 1:
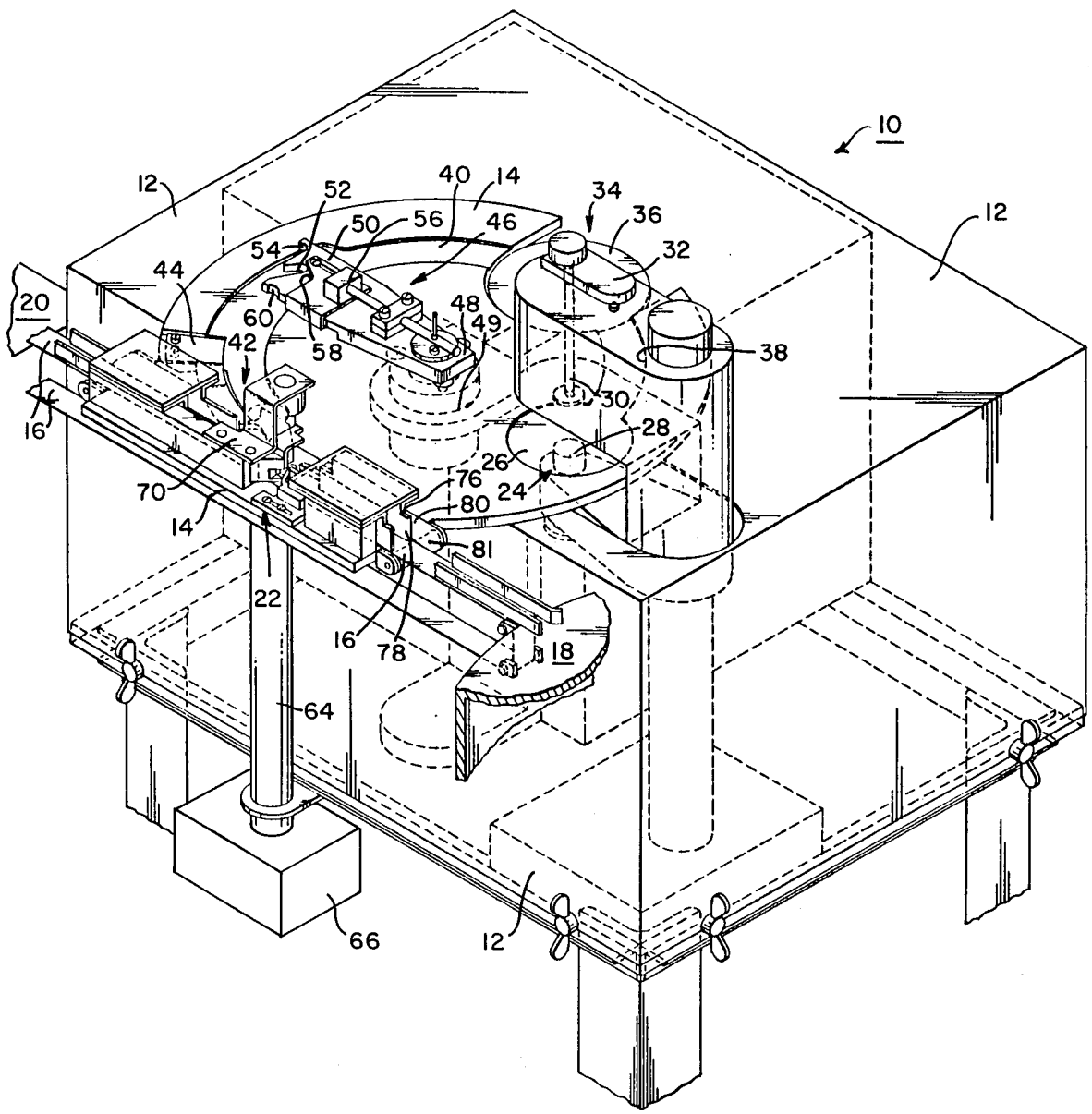
FIG. 1 is a view in perspective of the pellet dimension checker.
Figure 2:
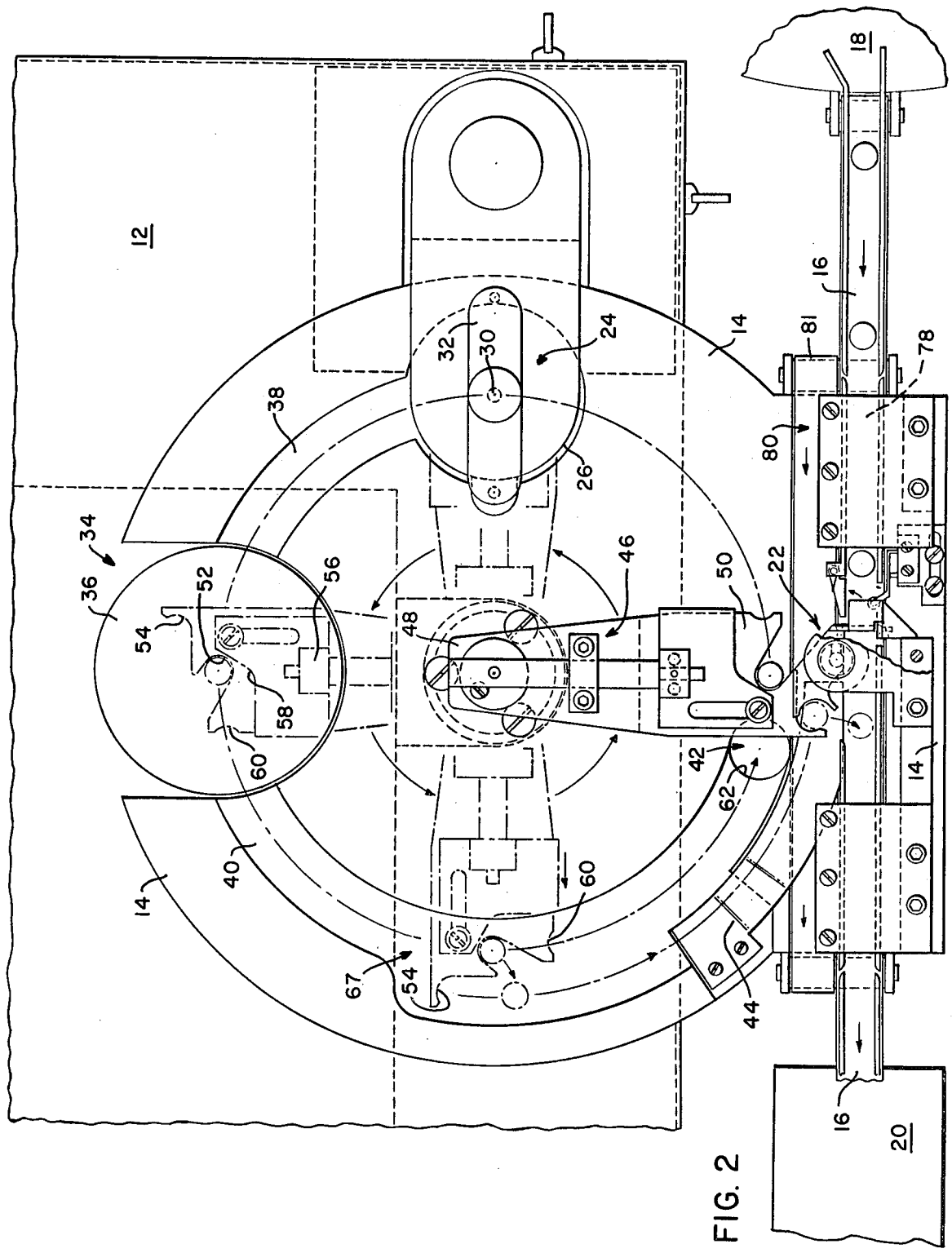
FIG. 2 is a plan view of the pellet dimension checker.

Referring to FIGS. 1 and 2 a pellet dimension checker referred to generally as 10 has a housing 12 with a platform 14 mounted thereon. Platform 14 may be a metal plate of about 0.5 inch thickness and bolted to housing 12 in a conventional manner. A conveyor 16 which may be chosen from those well known in the art is arranged partially on platform 14 and, adjacent to housing 12 so as to be able to convey pellets from a work station such as a pellet press station 18 to another work station such as a sintering process 20. A pellet indexer 22 is mounted on platform 14 and extends over conveyor 16 and is capable of removing a pellet from conveyor 16 or placing a pellet on conveyor 16.

Platform 14 has a length determining station 24 disposed thereon which may be a linear variable differential transformer (LVDT) which may be chosen from those well known in the art. The LVDT may consist of a plate 26 mounted on platform 14 for supporting a pellet such as pellet 28. The LVDT may have a rod 30 vertically arranged over plate 26 so as to be able to selectively contact the top of pellet 28. Rod 30 is connected to an electrical transformer 32 such that when activated electrical transfomer 32 will cause rod 30 to contact the top of pellet 28 on plate 26. Since the distance from the bottom of rod 30 in the non-activated position to plate 26 can be measured and known, and since when rod 30 is activated into contact with pellet 28 electrical transformer 32 can determine the travel of rod 30, the difference between the known distance and the traveled distance of rod 30 is the length of pellet 28. Therefore, the length of pellet 28 can be determined by length determining station 24. By knowing the length as determined and the approximate cross-sectional area as a standard dimension, the volume of the pellet can be determined. Of course, length determining station 24 need not be an LVDT but may also be a photo diode.

A weight determining station 34 is also arranged on platform 14 and may comprise a mass or weight balance pan 36 connected to a common mass balance (not shown). When a pellet has been positioned on pan 36 the weight of the pellet may be electronically determined. A comparison of the weight of the pellet with the length and volume as determined in length determining station 24 will yield the density of the pellet. This comparison can be an electronic comparison or it may be an operator comparison made from comparing a digital display of weight determining station 34 and length determining station 24. The digital readout may be located remote from the housing 12 so that the operator will not be exposed to radiation.

Still referring to FIGS. 1 and 2, a circumferential first slot 38 is cut in platform 14 beginning at a point lower than length determining station 24 and descending to a point higher than weight determining station 34 so that a pellet may be slid from length determining station 24 to weight determining station 34 without catching on the edges of the respective stations. Similarly, a circumferential second slot 40 is cut in platform 14 so as to descend from weight determining station 34 to disposal station 42. On the other hand, a ramp 44 is provided so that an acceptable pellet may be slid back up to the elevation of conveyor 16.

A rotatable transfer arm 46 has a first end 48 rotatably attached to the center of platform 14 in a conventional manner and has a second end 50 extending radially from the center of platform 14 to a radius approximately equal to the radius defined by length determining station 24, first slot 38, weight determining station 34, and second slot 40. A drive mechanism 49, such as a motor, is located below platform 14 and is attached to first end 48 so as to be able to sweep end 50 along the radius defined by length determining station 24 and weight determining station 34. Second end 50 has a first notch 52 therein that conforms to the shape of the pellet in the process. First notch 52 is located at a distance from the center of platform 14 approximately equal to the radius defined by length determining station 24 and weight determining station 34. A second notch 54, also conforming to the shape of the pellets, is also located in second end 50 but at a distance from the center of platform 14 greater than that of first notch 52. A radial actuator 56 which may be electrically or pneumatically operated is slidably attached to transfer arm 46 near second end 50. The electrical or pneumatic operator may be located with drive mechanism 49. Radial actuator 56 has a groove 58 therein that is capable of contacting a pellet in first notch 52. When actuated, radial actuator moves radially outward along transfer arm 46 so that groove 58 contacts the pellet in first notch 52 and slides the pellet out of first notch 52 to a distance from the center of platform 14 approximately equal to the location of second notch 54. Upon the rotation of transfer arm 46, the pellet that has been moved by radial actuator 56 will be caught in second notch 54 and carried along therein. In addition, a third notch 60 is also located in second end 50 on the lead edge thereof to catch any stray pellets that may be in the path of transfer arm 46. When a pellet has been guided into first notch 52 by pellet indexer 22, transfer arm 46 is capable of rotating about first end 48 which causes the pellet in first notch 52 to be slid along a path in platform 14. Transfer arm 46 is capable of stopping the pellet in first notch 52 at various locations such as those corresponding to length determining station 24 and weight determining station 34 so that appropriate dimensional measurements or other functions may be performed. If it is determined that the pellet is nonconforming, transfer arm 46 will be rotated until first notch 52 and the nonconforming pellet therein is located over disposal station 42. Disposal station 42 may comprise a hole 62 in platform 14 and a disposal tube 64 attached at one end to platform 14 around hole 62 and attached at the other end to a scrap hopper 66. The nonconforming pellet located over hole 62 will fall by gravity through disposal tube 64 into scrap hopper 66 from where the nonfonforming pellets may be taken to be reprocessed. In addition, third notch 60 is located on the same radius as hole 62 so that any stray pellets being caught therein will also be disposed of through hole 62. On the other hand, should it be determined that the pellet conforms to the predetermined standards, transfer arm 46 may be stopped at a location such as location 67 where second slot 40 widens to accommodate ramp 44. When stopped in this position, radial actuator 56 will cause the pellet in first notch 52 to be moved to a radial location corresponding to second notch 54 and radial actuator 56 will return to its original location. Transfer arm 46 will again be rotated thereby causing the pellet to be caught in second notch 54 and swept along and up ramp 44 to pellet indexer 22 at the elvation of conveyor 16.

Figure 3:
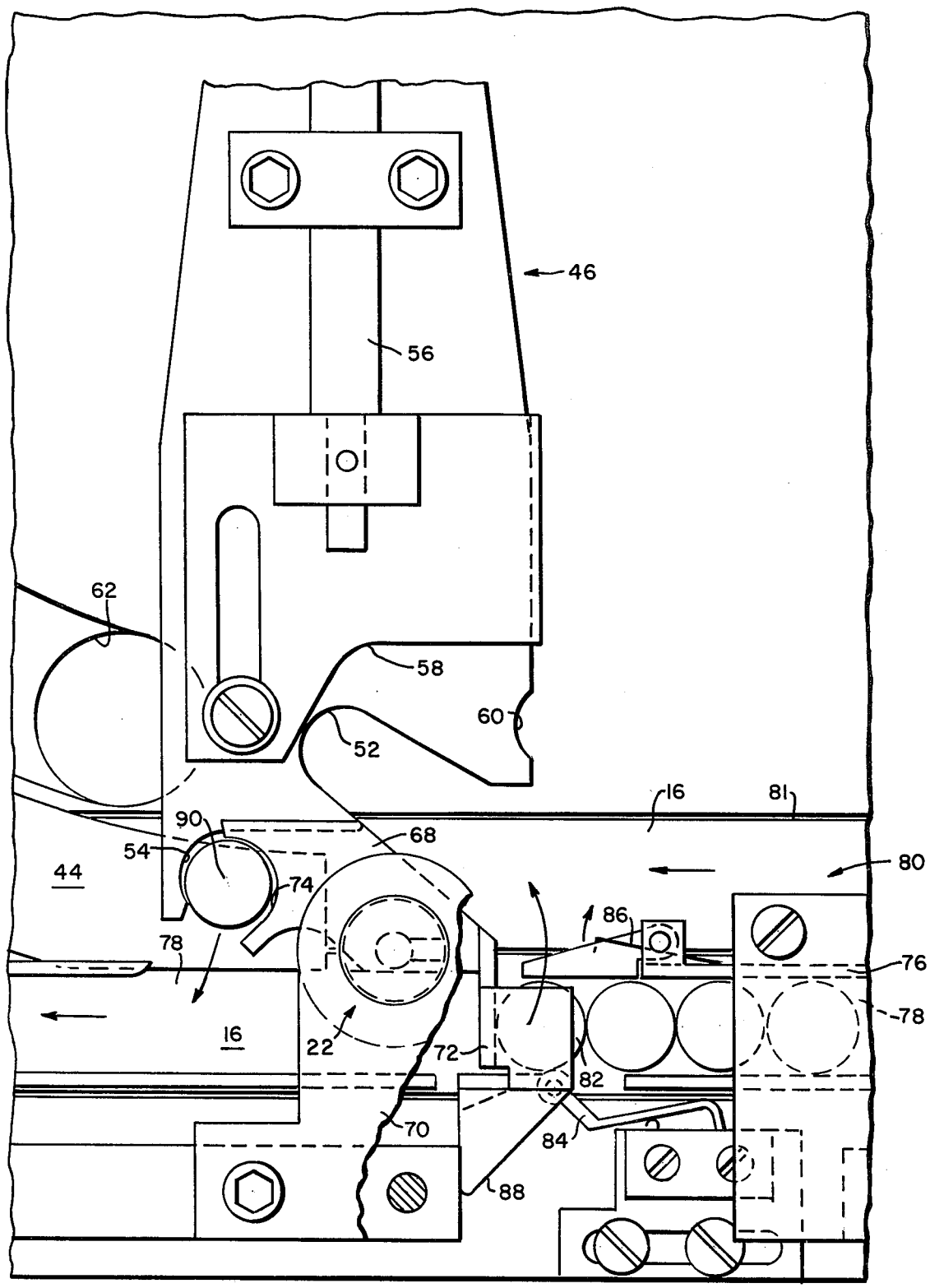
FIG. 3 is a partial view of the conveyor portion of the pellet dimension checker.
Figure 4:
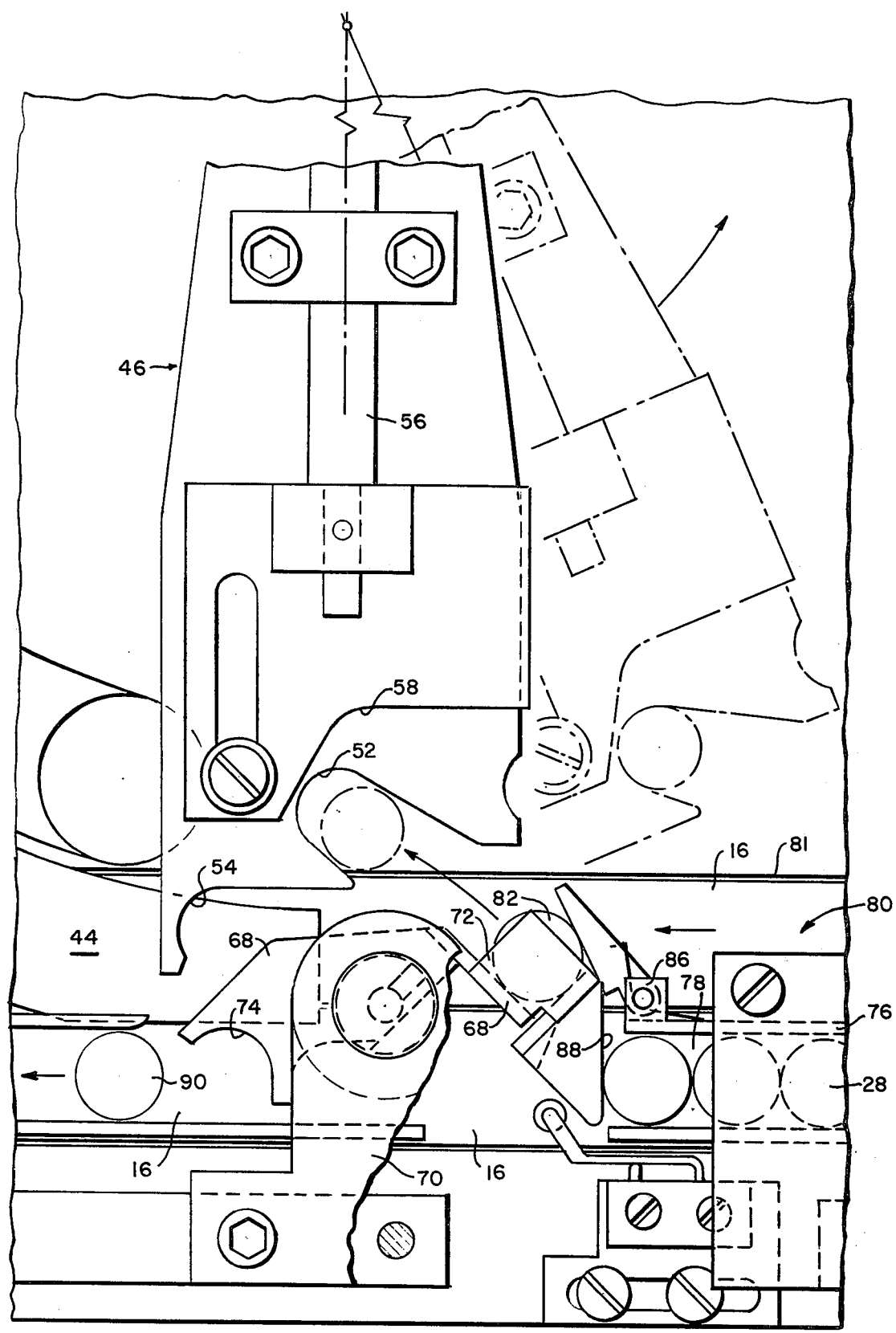
FIG. 4 is an actuated view of FIG. 3.

Referring now to FIGS 1-4, pellet indexer 22 comprises a pivotable bar 68 pivotally attached to attachment member 70 which is mounted on platform 14 so that pivotable bar 68 is suspended above conveyor 16. Pivotable bar 68 has a first receptacle 72 on one end and a second receptacle 74 on the other end that are capable of retaining a pellet therein. A partition 76 is suspended over conveyor 16 so as to define a first channel 78 on conveyor 16 and a second channel 80 on a second conveyor 81 through which the pellets 28 may pass as the conveyors move the pellets thereon in the direction of indexer 22. As the pellets form a row in first channel 78, a pellet such as pellet 82 will be moved into first receptacle 72. As pellet 82 is moved into first receptacle 72, it will contact a sensor 84 which may be a limit switch chosen from those well known in the art. When sensor 84 detects a pellet such as pellet 82 in the first receptacle 72, an operator or an electrical control system can send a signal to pellet indexer 22 which activates solenoid (not shown) and causes pivotable bar 68 to pivot about its attachment to attachment member 70 as shown in FIGS. 3 and 4. The pivoting of pivotable bar 68 causes first receptacle 72 to move through gate 86 and into second channel 80. Gate 86 may be a spring actuated restraint member that separates first channel 78 from second channel 80 near first receptacle 72 so as to direct the pellets into first receptacle 72. At the same time, stop 88 on first receptacle 72 prevents the further advance of pellets in first channel 76. When first receptacle 72 has been moved through gate 86, the pellet 82 in first receptacle 72 is free to be moved out of first receptacle 72 under the action of second conveyor 81. Since second conveyor 81 is continuously moving, pellet 82 is advanced out of first receptacle 72 and into first notch 52 of transfer arm 46. From this position, transfer arm 46 can position the pellet in appropriate locations for dimensional measurement such as in length determining station 24. At the same time, a pellet such as pellet 90 located in second notch 54 is contacted by second receptacle 74 and moved into first channel 78 in a position to be moved away from pellet indexer 22. Once this transfer of pellets has been completed, pivotable bar 68 returns to its original position as shown in FIG. 3. Thus pellet indexer 22 provides a mechanism for transferring a pellet from conveyor 16 to transfer arm 46 and, at the same time, transferring another pellet from transfer arm 46 to conveyor 16.

OPERATION

Pellets 28 from a station such as pellet press station 18 are moved by conveyor 16 through first channel 78 to pellet indexer 22. As a pellet such as pellet 82 enters first receptacle 72 as shown in FIG. 3, pellet 82 contacts sensor 84 and a signal is sent by an operator or electrical control to pellet indexes 22 which causes pivotable bar 68 to pivot about its attachment. The pivoting of pivotable bar 68 causes first receptacle 72 to move through gate 86 and into second channel 80 where pellet 82 is moved out of first receptacle 72 by second conveyor 81. At the same time, stop 88 prevents the further advance of pellets in first channel 78. Pellet 82 in second channel 80 proceeds into first notch 52 of transfer arm 46. Drive mechanism 49 is then activated which causes transfer arm 46 to rotate about its first end 48. Transfer arm 46 transfers the pellet in first notch 52 to length determining station 24 where the length of the pellet is determined. Once the length of the pellet has been determined, transfer arm 46 positions the pellet in weight determining station 34 where its mass or weight is determined. The density of the pellet may then be determined either by an operator or by a calculator using the length and weight as previously determined. If the pellet is determined to be not acceptable, transfer arm 46 is rotated so that first notch 52 is located over hole 62 of disposal station 42 where the nonconforming pellet falls by gravity through disposal tube 64 and into scrap hopper 66. If the pellet is determined to have dimensions within predetermined limits, transfer arm 46 moves the pellet to location 67 where radial actuator 56 slides the pellet out of first notch 52 and into a radial location corresponding to second notch 54. At this point, transfer arm 46 again is rotated which causes the pellet to be caught in second notch 54 and moved therein up ramp 44 to pellet indexer 22. Before transfer arm 46 has been rotated into position near pellet indexer 22, pivotable bar 68 is pivoted into a position such that second receptacle 74 is aligned with second notch 54. Transfer arm 46 then moves into position near pellet indexer 22 as shown in FIG. 3. Pivotable bar 68 then moves the pellet back into first channel 78 where the pellet proceeds on to the next work station. Of course, at the same time, a new pellet is moved into first notch 52 by pellet indexer 22.

I claim as my invention:

1. A pellet dimension checker comprising:
   a housing;
   delivery means disposed near said housing for conveying a pellet to and from said housing;
   a platform having a hole therein mounted on said housing and adjacent to said delivery means for supporting said pellet;
   a transfer arm mounted on said platform and having a first end rotatably attached to said platform and having a second end extending near said delivery means for engaging said pellet which has been conveyed by said delivery means and for transferring said pellet along said platform by rotating about said first end;
   length determining means mounted on said platform for measuring the length of said pellet when said pellet has been positioned therein by said transfer arm; and
   weight determining means mounted on said platform for measuring the weight of said pellet when said pellet has been positioned therein by said transfer arm, said transfer arm returning said pellet to said delivery means when said length determining means and said weight determining means have determined that the length and weight of said pellet are within predetermined limits and said transfer arm positioning said pellet over said hole in said platform when said pellet is determined not to be within said predetermined limits.

2. The pellet dimension checker according to claim 1 wherein said delivery means comprises:
   a conveyor partially mounted on said platform for conveying a pellet to and from said platform; and
   a pellet indexer attached to said platform and disposed over said conveyor for transferring pellets between said conveyor and said transfer arm.

3. The pellet dimension checker according to claim 2 wherein said pellet indexer comprises:
   a pivotable bar mounted over said conveyor having a first receptacle on one end for receiving a pellet from said conveyor and transferring the pellet to said transfer arm and having a second receptacle on the other end for receiving a pellet from said transfer arm and transferring the pellet to said conveyor, said transferring of pellets being performed by said pivotable bar pivoting about its attachment.

4. The pellet dimension checker according to claim 3 wherein said pellet indexer further comprises:
   a stop attached to said first receptacle for preventing the advance of other pellets on said conveyor when said first receptacle has been pivoted toward said transfer arm.

5. The pellet dimension checker according to claim 4 wherein said pellet indexer further comprises:

pellet sensing means disposed near said first receptacle for determining when a pellet is in said first receptacle.

6. The pellet dimension checker according to claim 5 wherein said pellet indexer further comprises:

a pivotable gate disposed near said first receptacle for directing the flow of pellets into said first receptacle while being able to pivot open under the action of said first receptacle to allow said first receptacle to pass therethrough.

7. The pellet dimension checker according to claim 6 wherein said transfer arm has a first notch in said second end for engaging a pellet and a second notch in said second end located farther from said first end than said first notch for engaging a pellet therein.

8. The pellet dimension checker according to claim 7 wherein said transfer arm further comprises:

a radial actuator mounted between said first and second ends for moving a pellet from said first notch to said second notch.

9. The pellet dimension checker according to claim 1 wherein said length determining means comprises:

a linear variable differential transformer attached to said platform for measuring the length of a pellet positioned therein by said transfer arm.

10. The pellet dimension checker according to claim 9 wherein said linear variable differential transformer comprises:

a plate mounted on said platform for supporting a pellet;

a rod vertically arranged over said plate for selectively contacting the top of the pellet; and an electrical transformer associated with said rod and vertically arranged over said plate for controlling the travel of said rod.

11. The pellet dimension checker according to claim 1 wherein said weight determining means comprises:

a weight balance disposed in said platform for determining the weight of a pellet positioned thereon.

* * * * *